(12) United States Patent
Ma

(10) Patent No.: US 6,900,665 B2
(45) Date of Patent: May 31, 2005

(54) TRANSFER OF DIGITAL DATA ACROSS ASYNCHRONOUS CLOCK DOMAINS

(76) Inventor: James Ma, 2002 Forgetree Ct., San Jose, CA (US) 95131

( * ) Notice: Subject to any disclaimer, the term of this patent is extended or adjusted under 35 U.S.C. 154(b) by 0 days.

(21) Appl. No.: 10/630,543

(22) Filed: Jul. 29, 2003

(65) Prior Publication Data

US 2004/0251932 A1 Dec. 16, 2004

Related U.S. Application Data

(63) Continuation-in-part of application No. 10/458,878, filed on Jun. 10, 2003.
(51) Int. Cl.[7] .............................................. H03K 19/00
(52) U.S. Cl. ......................... 326/94; 375/354; 327/145
(58) Field of Search ........................... 326/94; 327/144, 327/145; 375/354, 355, 357; 710/58; 370/298, 503

(56) References Cited

U.S. PATENT DOCUMENTS 5,602,878 A * 2/1997 Cross ......................... 375/354
6,055,285 A   4/2000 Alston

OTHER PUBLICATIONS

ICT paper entitled "PEEL™ Device Metastability"; date unknown but known to be before Jun. 10, 2003; 3 pp.
Semiat, et al., "Timing Measurements of Synchronization Circuits," VLSI Systems Research Center, Technion—Israel Institute of Technology, Haifa, Israel; May 2003; 10 pp.
Varma, et al., "Metastability Reduction by Aperture Transformation," IBM India Research Laboratory, Centre for Applied Research Electronics, New Delhi, India; date unknown but known to be before Jun. 10, 2003; 10pp.

* cited by examiner

Primary Examiner—Daniel D. Chang
(74) Attorney, Agent, or Firm—Fish & Richardson P.C.

(57) ABSTRACT

A method and circuit for transferring multiple bits of data across asynchronous clock domains is provided. The method includes detecting a change in a status bit of a data word being transferred from a source in a source clock domain to a destination register in a destination clock domain, the source clock and destination clock being asynchronous. The method includes sampling the detected change in reference to a change window where the change window is sized to encompass all bits of the data word. A stable input is selected for each bistable circuit of the destination register based on whether the detected change in the status bit is likely to produce metastability in the receiving register.

20 Claims, 5 Drawing Sheets

TRANSFER OF DIGITAL DATA ACROSS ASYNCHRONOUS CLOCK DOMAINS

CROSS-REFERENCE

This application is a continuation in part and claims priority to the currently pending U.S. application Ser. No. 10/458,878, filed on Jun. 10, 2003, the specification of which is incorporated herein by reference in its entirety.

TECHNICAL FIELD

This invention relates to circuits for transferring multiple bits of digital data across asynchronous clock domains.

BACKGROUND

In digital data systems it is often necessary to transfer data between asynchronous clock domains. A clock domain is a group of logic circuits where all of the clocked storage elements, such as flip-flops and registers, are clocked by the same clock. Two clock domains are asynchronous with respect to each other if their respective clocks have no fixed phase relationships. For example, a processor that is operating at a clock frequency of 2 GHz may need to send 64 bits of data to a PCI-X bus that is operating at a clock frequency of 133 MHz. In this case, the two clocks do not have a fixed phase relationship with each other so the two clock domains are asynchronous.

Another example is a graphics processor that needs to transfer data between a system bus operating at 533 MHz and the graphics memory that is operating at a data rate of 800 MHz. The two clock domains have no fixed relationship with each other, and thus are asynchronous.

Digital data is most commonly stored in flip-flops or RAMs. A group of flip-flops is also known as a register. A register may be comprised of any number of flip-flops but groupings of 8, 16, 32, and 64 flip-flops are common. A register composed of 8 flip-flops would typically have 8 inputs and 8 outputs. All of the flip-flops in a register are clocked by the same clock. Registers are lower in storage density compared to RAMs, but are much faster in operation. Thus, registers are often used when data must be stored and retrieved quickly.

Since registers are composed of flip-flops, the data at the input of the register is sampled by the clock edge, as in a flip-flop, and stored in the register. However, also as in flip-flops, the data must be stable for a period of time before and after the clock edge to avoid metastability. The period of time before the clock edge is called the setup time and the period after the clock edge is called the hold time.

Conventional registers cannot be used to store data if the data is coming from an asynchronous clock domain. Because of the unknown clock phase relationship between the sending clock and the receiving clock, the data cannot be guaranteed to satisfy the setup and hold requirements of the receiving register. Metastability may ensue if a register is used to store data coming from an asynchronous clock domain. Once a register goes into a metastable state, the outputs of the register are neither logical 0s nor logical 1s, as expected. Furthermore, there is no limit on the duration of the metastable state and no guarantee the eventual stable outputs will have any relationship to the asynchronous data which triggered the metastable event.

To avoid metastability, complex signaling protocols can be used to indicate the data is stable and may be clocked into the receiving register. Many elaborate protocols and circuits have been devised to signal the availability of stable data for transfer between asynchronous clock domains. Some of these are described below.

A first in first out memory ("FIFO") is another mechanism used to transfer data across asynchronous clock domains. Data is written into the FIFO by the source clock domain logic and read out by the destination clock domain logic. The delay between writing and reading insures the validity of the data.

The costs of these complex protocols or FIFOs are additional latency in data transfer and more logic circuits. The additional latency is undesirable for high performance systems and additional logic is undesirable for both power consumption and chip size. Thus there is a need for a high speed and low latency method and apparatus to transfer multiple bits of data across asynchronous clock domains.

The most common method of synchronizing an asynchronous signal using flip-flops is to connect two flip-flops in series. The asynchronous signal is connected to the data input of the first flip-flop. The output of the first flip-flop is connected to the input of the second flip-flop, possibly with a small delay gate inserted. Both flip-flops are clocked with the clock of the receiving clock domain. Then the output of the second flip-flop is treated as the synchronized version of the asynchronous signal.

This method depends on the usually finite duration of the metastable state to guarantee the second flip-flop will not sample an undefined output from the first flip-flop. Unfortunately, this technique does not extend easily to multiple bits of data. The random resolution of the metastable state means that a register will not settle to a stable output that is related to the original input data. So while a second register will most likely sample stable output from a first register that is coming out of a metastable state, that data will have no resemblance to the original asynchronous data sampled by the first register.

Existing solutions either create new clocks that do not have edges close to each other or devise protocols to insure data is stable before being sampled by a receiving register.

SUMMARY

In one aspect, the invention provides a method for transferring multiple bits of data across asynchronous clock domains. The method includes detecting a change in a status bit of a data word being transferred from a source in a source clock domain to a destination register in a destination clock domain, the source clock and destination clock being asynchronous. The method includes sampling the detected change in reference to a change window where the change window is sized to encompass all bits of the data word. A stable input is selected for each bistable circuit of the destination register based on whether the detected change in the status bit is likely to produce metastability in the receiving register.

Aspects of the invention can include one or more of the following features. The data and a status bit can be registered in a source register clocked by the source clock. The status bit can be toggled for each word of data to be transferred to the destination clock domain. Each output of the source can be connected to an input of a receive register, which is comprised of a group of multiplexers each coupled to an input of a corresponding bistable circuit. Each multiplexer can be configured to receive a signal selecting the stable input. A control signal can be output to select the stable input for each bistable circuit of the receiving register if transitions in the fixed window are likely to induce metastability in the receiving register. One of two inputs can be selected in response to the monitoring circuit control signal for storage in the flip-flop. The receiving register flip-flops can be clocked with a delayed copy of the destination clock. The bistable circuits can include one of flip-flops and latches. The source can include a FIFO and a RAM. The method can include transferring a data word from the source to a plurality of destination registers.

In another aspect, the invention provides a circuit for transferring multiple bits of data across asynchronous clock domains and includes a source clocked by a first source clock where the source stores a data word and a status bit. The circuit includes a receiving circuit including a monitoring circuit, a delay element, first and second groups of delay elements and a destination register. One input of the monitoring circuit is operatively coupled to receive a status bit output of the source, a second input operatively coupled to receive a destination clock, and an output operatively coupled to control inputs of a group of multiplexers. The delay element has an input operatively coupled to the destination clock and an output operatively coupled to a clock input of a destination register. The first group of delay elements are equal in number to the number of bits in the source, wherein each delay element of the first group of delay elements has an input operatively coupled to one source output. The second group of delay elements are equal in number to the number of bits in the source, wherein each delay element of the second group of delay elements has an input operatively coupled to the same source output as a corresponding delay element in the first group of delay elements. The destination register has data inputs operatively coupled to the outputs of the group of multiplexers. The group of multiplexers are equal in number to the number of bits in the destination register. Each multiplexer has a first data input operatively coupled to receive a signal from an output of a corresponding delay line of the first group of delay lines and a second data input operatively coupled to receive a signal from an output of a corresponding delay line of the second group of delay lines.

Aspects of the invention can include one or more of the following features. The circuit can include a plurality of receiving circuits. The source can include a register, a FIFO and a RAM. The destination register can include flip-flops and latches. The second data input of each multiplexer of the group of multiplexers can be operatively coupled to a static signal. The second data input of each multiplexer of the group of multiplexers can be operatively coupled to an output of the destination register.

The invention can be implemented to realize one or more of the following advantages. A technique for moving multiple bits from one clock domain to another is provided. A monitoring circuit monitors a status bit to determine when a new data word is to cross from a source clock domain to a destination clock domain. In one implementation, multiple bit words are transferred from a source register in a first clock domain to a receiving register in a second domain so that no words are lost. In another implementation, multiple bit words are transferred from a source register in a first clock domain to two receiving registers in other clock domains. All of the source data words are captured by either or both of the receiving registers. No data words are lost despite being received by a lower frequency clocked register. Some data words are captured by both receiving registers.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A technique to transfer multiple bits of data, also commonly known as a data word, across asynchronous clock domains is described. The technique uses registers placed and routed close to each other with a source register comprised of standard flip flops and one or more special receiving registers which are capable detecting transitions in the inputs which will likely cause metastability and of selecting delayed versions of their inputs to avoid metastability.

Figure 1:
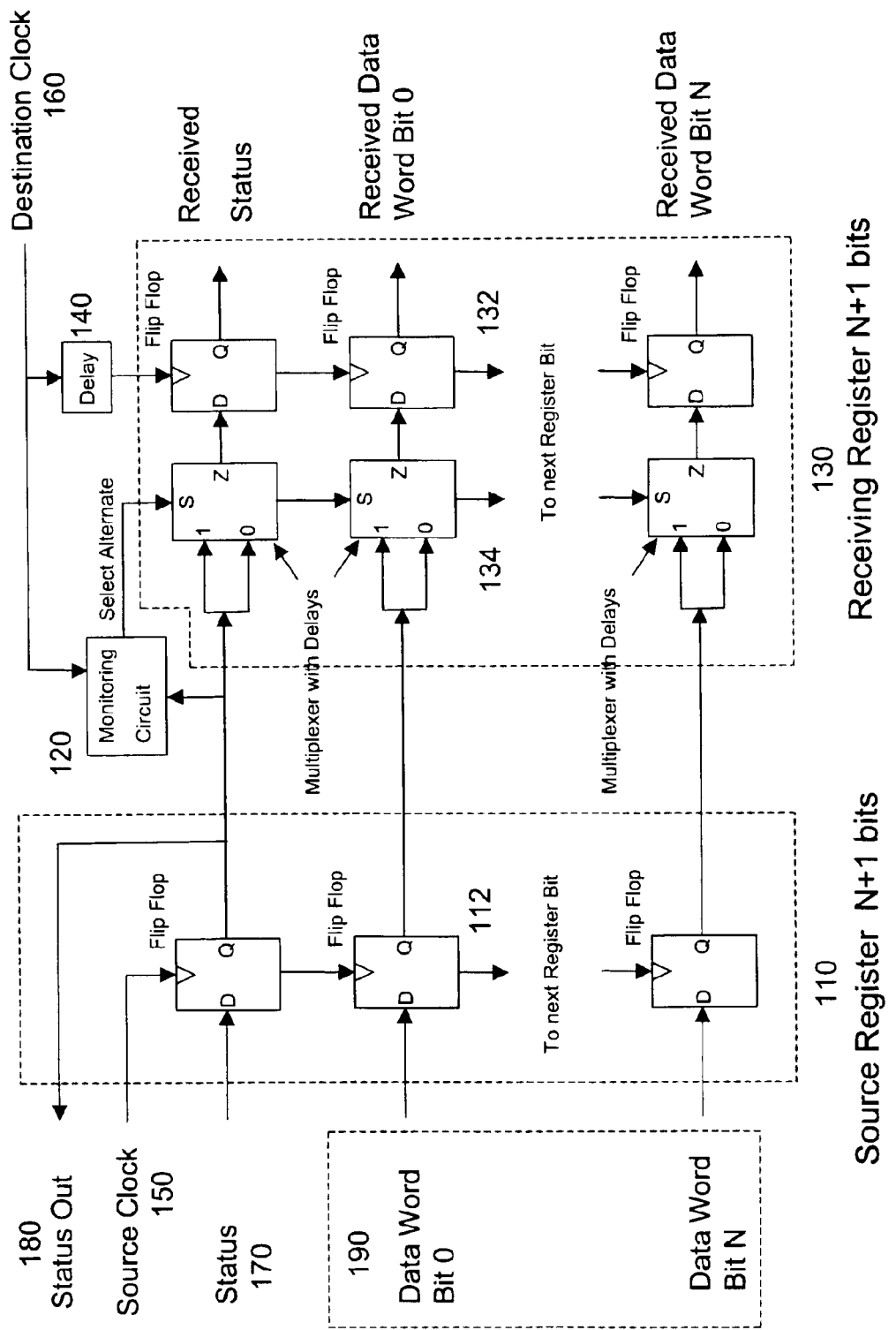
FIG. 1 illustrates an implementation of a circuit for transferring data across asynchronous clock domains.

FIG. 1 illustrates an implementation of a circuit for transferring data across asynchronous clock domains. The circuit includes a source register 110, a monitoring circuit 120, a receive register 130, and a delay element 140. The source register 110 includes a plurality of flip-flops 112. The receive register 130 includes a plurality of flip-flops 132 and multiplexers 134. While the circuits are described with reference to flip-flops, latches can be substituted with adjustments obvious to those skilled in the art. The source register 110 can also be replaced by a FIFO or RAM.

A data word 190 and a status bit 170 from the source clock domain are stored in the source register 110 clocked by source clock 150. The status bit 170 is toggled for every data word 190 to be transferred to the destination clock domain. The status bit 170 and data word (bits) 190 are transmitted to receiving register 130. The status bit output 180 of source register 110 can also be supplied to other logic circuits for possible use in the source clock domain.

A data word 190 and a status bit 170 are registered in a source register clocked by the source clock 150. The status bit for each word of data to be transferred across to the destination clock domain is toggled.

Since the data word 190 and status bit 170 are stored in source register 110, all of the bits are constrained to change values within a small window after the source clock 150 edge. Due to the variation in delays for a rising signal edge versus a falling signal edge, clock skews to the flip flops and differences in layout for the flip flops in a register, the register bits will not change values at exactly the same time but can be constrained to all change within a small window of time. It is possible to determine the slowest changing bit and the fastest changing bit of a register after layout on a chip has been completed. The difference between the slowest bit and the fastest bit defines the window of change. This difference is fixed and known once layout and characterization are completed.

A receive register 130 clocked by a delayed version of the destination clock 160 has each of its input bits connected to a corresponding output bit of the source register 110. A monitoring circuit 120 looks at the status bit output 180 for transitions and determines if the transitions will induce metastability in the receiving register bit. An example of a monitoring circuit 120 that can be used in the circuit of FIG. 1 is described in U.S. patent application Ser. No. 10/458,878, entitled "Prevention of Metastability in Bistable Circuits," incorporated here in its entirety.

Figure 2:
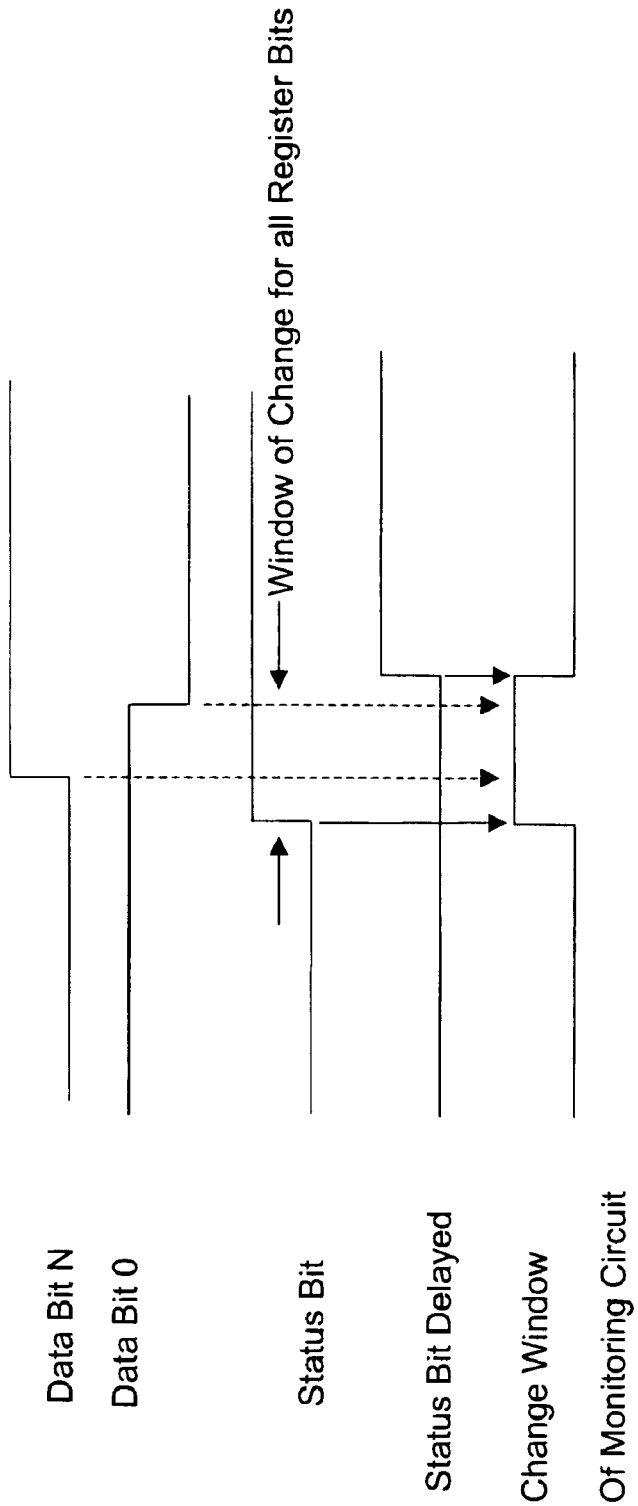
FIG. 2 is a graphical which illustrates a change window for all source register output bits.

The monitoring circuit 120 generates a change window using the status bit output 180 and a delayed version of the status bit output 180, as illustrated in FIG. 2. The amount of delay determines the width of the change window. This change window is selected to be slightly larger than the window of change for all output bits of the source register 110. By assigning the status bit 170 to the fastest bit of the register, all other register bits will change after the status bit.

In FIG. 2, Data bit 0 represents the slowest bit which changes state last. The fastest bit and the slowest bit can be determined using known methods such as simulation and analysis. The width of the change window is established by delaying the status bit enough to ensure that the slowest bit changes within the change window. Thus, the monitoring circuit can look only at the status bit change window and know that any other bit transitions will be within the change window. Data Bit N represents a bit of the data word between the status bit and the slowest bit, Data Bit 0.

Referring again to FIG. 1, monitoring circuit 120 uses the destination clock 160 to sample the change window. When the monitoring circuit 120 detects a status bit change which can cause metastability, a control signal is generated (or asserted) to select alternate stable inputs for all of the flip flops 132 in the receive register 130. The control signal is asserted if the monitoring circuit 120 determines the change window is occurring too close to a delayed version of the destination clock 160. Each flip-flop 132 in the receive register 130 is coupled to a multiplexer 134 which receives the control signal from the monitoring circuit 120 in its S input. The multiplexer selects one of two inputs to be sampled and stored in a respective flip-flop 132. The multiplexer can have delay elements associated with the inputs. One of the inputs, the "0" input, of multiplexer 134 is a delayed version of the source register 110 output and is selected when the control signal is low or not asserted. The other input signal, the "1" input, of multiplexer 134 is selected when the control signal is high or asserted. The "1" input signal can be an alternately delayed copy of the source register 110 output, an alternately delayed copy of the source register 110 output with inversion, a static signal or the output of the corresponding receive flip flop 132. The destination clock 160 is delayed through delay element 140. This delayed version of the destination clock 160 is used to clock the flip-flops 132 of the receive register 130.

An example of a flip-flop which can select from one of two inputs in response to a control signal and that is clocked by a delayed clock is also disclosed in U.S. patent application Ser. No. 10/458,878.

Figure 3:
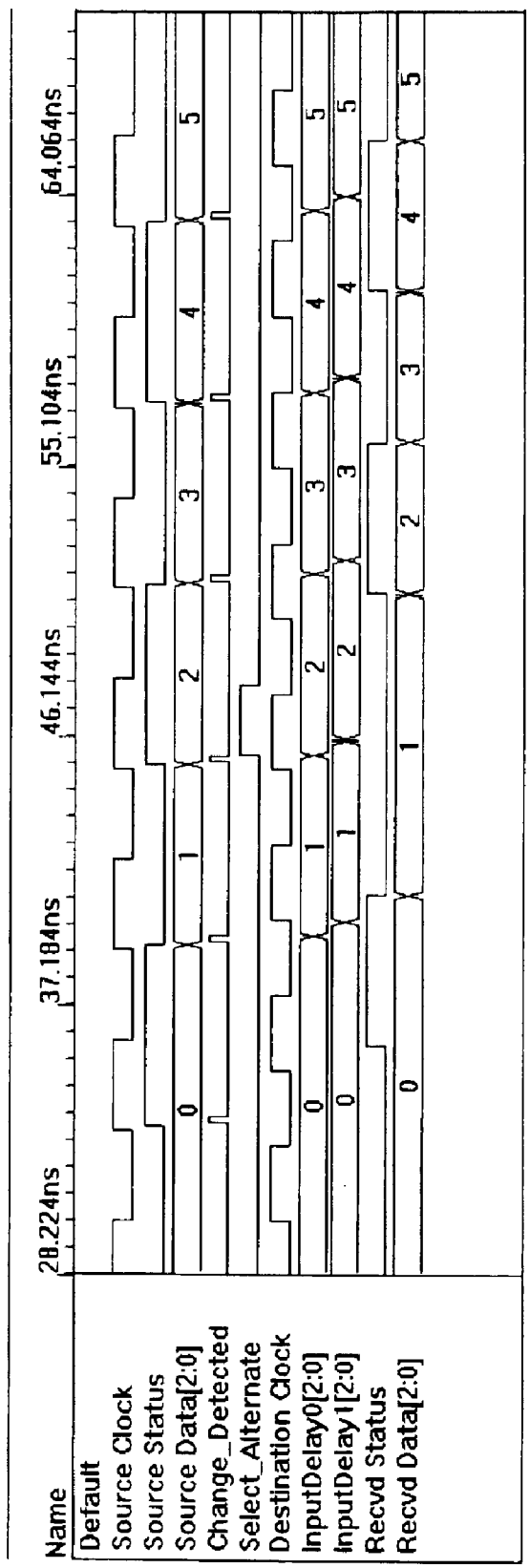
FIG. 3 illustrates the operation of the circuit of FIG. 1.

FIG. 3 illustrates the operation of the circuit of FIG. 1. Referring to FIGS. 1 and 3, the waveform labeled "Source Clock" shows the source clock 150 of the source register 110. In this example, the "Source Clock" signal is lower in frequency than the "Destination Clock" signal.

The waveform labeled "Source Status" shows the output of the source register status bit 180. This is the signal being monitored by the monitoring circuit 120. The "Source Status" signal toggles for each new data word.

The waveform labeled "Source Data[2:0]" shows the outputs of the source register data bits. In this example, the source register 110 has 3 bits of data. The waveform labeled "Change_Detected" shows the change window generated by the monitoring circuit 120 from the status bit 180. This signal is internal to the monitoring circuit. The "Change_Detected" signal is generated for each new data word because of the status bit toggle.

The waveform labeled "Select_Alternate" shows the monitoring circuit 120 output as a result of sampling the change window. "Select_Alternate" goes high when the monitoring circuit 120 decides that the change window is occurring too close to the delayed copy of the destination clock 160. In this example, Select_Alternate goes high for data word 2, which is changing close to the rising edge of the destination clock. The waveform labeled "Destination Clock" shows the destination clock 160. The destination clock 160 is used to clock the receiving register flip-flops 132 after a delay. The destination clock 160 is also used by the monitoring circuit 120 for sampling the change window.

The waveform labeled "InputDelay0[2:0]" shows the delayed copy of the source data for the "0" input of the multiplexer. The waveform labeled "InputDelay1[2:0]" shows another delayed copy of the source data for the "1" input of the multiplexer.

The waveform labeled "Recvd Status" shows the output of the receive register 130 status bit. The receive register status bit toggles for each new data word received. The waveform labeled "Recvd Data[2:0]" shows the output of the receive register data bits.

Figure 4:
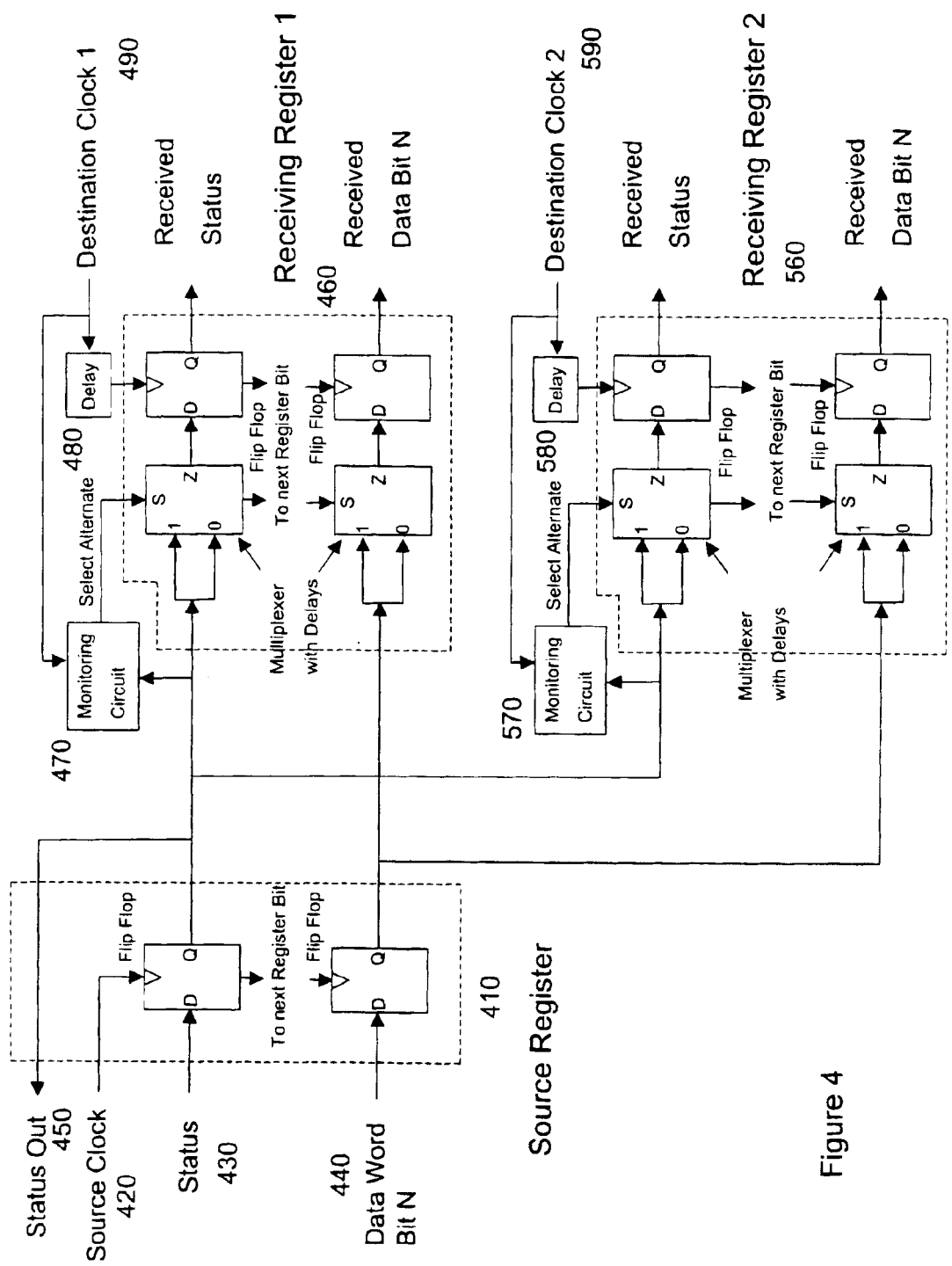
FIG. 4 illustrates another implementation of a circuit for transferring data across asynchronous clock domains.

FIG. 4 shows another implementation of a circuit for transferring data across asynchronous domains. In this implementation, the source register 410 is connected to two separate receive registers 460, 560, each clocked by a different clock 490, 590. Each receive register 460, 560 has an associated monitoring circuit 470, 570 and delay element 480, 580. This configuration can be used if the source data needs to be transferred to two separate destination clock domains.

This configuration can also be used if the source clock 420 is faster than the destination clock by less than two times the destination clock frequency. For this scenario, the destination clock 1 (clock 490) and destination clock 2 (clock 590) can be inverted copies of each other. By sampling the source status 430 and data word 440 with a true and an inverted destination clock, the effective sampling rate is doubled. Thus, the faster changing source status 430 and data word 440 may still be transferred to a slower destination clock domain without possibility of aliasing. It should be obvious that four receiving registers, each clocked by a 90-degree phase offset clock, will allow transfer of data from a source register clocked at up to four times the frequency of the receiving clock. If duplicate data words are received in the destination registers, the duplicate data words may be easily removed by other additional logic circuits in the destination clock domain.

Figure 5:
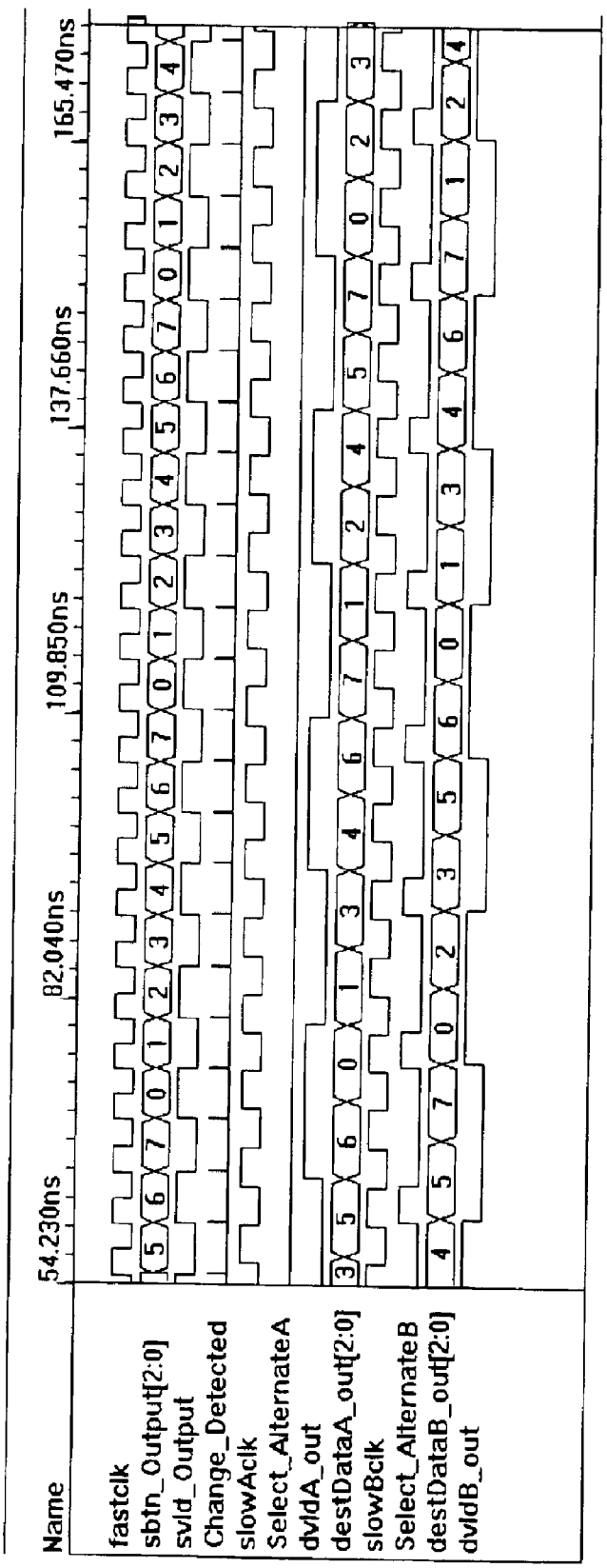
FIG. 5 illustrates the transfer of data from a faster clock domain to a slower clock domain by using two receiving registers clocked by complementary clocks.

FIG. 5 illustrates the transfer of data from a faster clock domain to a slower clock domain by using two receive registers clocked by complementary clocks. Referring to FIGS. 4 and 5, the waveform labeled "fastclk" shows the source clock 420 used to clock the source register 410. The waveform labeled "svld_Output" shows the output of the source register status bit 450. This is the signal being monitored by both monitoring circuits. As shown, the "svld_Output" signal toggles for each new data word.

The waveform labeled "sbtn_Output[2:0]" shows the outputs of the source register data bits. In this example, the source register 410 has 3 bits of data. The waveform labeled "Change_Detected" shows the change window generated by the first monitoring circuit 470 from the output of the source register status bit 450. This signal is internal to the first monitoring circuit. This signal is generated for each new data word because of the status bit toggle. The second monitoring circuit will also generate a substantially identical signal as well.

The waveform labeled "slowAclk" shows the destination clock 1 (clock 490) used to clock the first receiving register 460 after a delay 480. The "slowAclk" signal is also used by the first monitoring circuit 470 for sampling the change window.

The waveform labeled "Select_AlternateA" shows the first monitoring circuit output as a result of sampling the change window using its destination clock1 (clock 490). "Select_AlternateA" goes high when the first monitoring circuit 470 decides that the change window is occurring too close to the delayed copy of its destination clock. In this example, "Select_AlternateA" does not go high because none of the transitions are close to the rising edge of its destination clock.

The waveform labeled "dvldA_out" shows the output of the first receive register status bit. In the example shown, the "dvldA_out" signal does not toggle for each new data word received. This is because its clock frequency is lower than the clock frequency of the status bit it is sampling.

The waveform labeled "destDataA_out[2:0]" shows the output of the first receive register data bits. The waveform labeled "slowBclk" shows the inverted copy 590 of destination clock used to clock the second receiving register 560 after a delay 580. The "slowBclk" signal is also used by the second monitoring circuit 570 for sampling the change window.

The waveform labeled "Select_AlternateB" shows the second monitoring circuit output as a result of sampling the change window. "Select_AlternateB" goes high when the monitoring circuit decides that the change window is occurring too close to the delayed copy of its destination clock. In this example, "Select_AlternateB" goes high once every three cycles.

The waveform labeled "dvldB_out" shows the output of the second receiving register status bit. In this example, the "dvldB_out" signal does not toggle for each new data word received. This is because its clock frequency is lower than the clock frequency of the status bit it is sampling. The waveform labeled "destDataB_out[2:0]" shows the output of the second receiving register data bits.

One of ordinary skill in the art will recognize that in these waveforms all of the source data words are captured by either or both of the receive registers. No data words are lost despite being received by a lower frequency clocked register. Some data words are captured by both receive registers. The duplicate data words may be easily removed by other additional logic circuits in the destination clock domain.

A number of embodiments of the invention have been described. Nevertheless, it will be understood that various modifications may be made without departing from the spirit and scope of the invention. For example, although a flip-flop is shown as the bistable circuit, a similar metastability prevention circuit can be used for a latch. Although the latch is a level sensitive device instead of an edge sensitive device like the flip-flop, the same or similar components can be used with adjustments to the delay elements. Also the use of gates can be varied, such as, for example, an OR gate can be replaced with a NOR gate. Accordingly, other embodiments are within the scope of the following claims.

What is claimed is:

1. A method for transferring multiple bits of data across asynchronous clock domains comprising the steps of:
   detecting a change in a status bit of a data word being transferred from a source in a source clock domain to a destination register in a destination clock domain, the source clock and destination clock being asynchronous;
   sampling the detected change in reference to a status bit change window, the status bit change window sized to encompass all bits of the data word;
   selecting a stable input for each bistable circuit of the destination register based on whether the detected change in the status bit is likely to produce metastability in the destination register including selecting the stable input if the status bit change window occurs too close to an edge of a delayed version of the destination clock.

2. The method of claim 1, further comprising:
   toggling the status bit for each word of data to be transferred to the destination clock domain.

3. The method of claim 1, further comprising:
   connecting each output of the source to an input of a receive register which is comprised of a group of multiplexers each coupled to an input of a corresponding bistable circuit, each multiplexer configured to receive a signal selecting the stable input.

4. The method of claim 1, further comprising:
   outputting a control signal to select the stable input for each bistable circuit of the destination register if transitions in the change window are likely to induce metastability in the destination register.

5. The method of claim 4, further comprising:
   selecting one of two inputs in response to monitoring the control signal for storage in each bistable circuit.

6. The method of claim 1, wherein the bistable circuits include one of flip flops and latches.

7. The method of claim 1, wherein the source includes a FIFO.

8. The method of claim 1, wherein the source includes a RAM.

9. The method of claim 1, further comprising transferring a data word from the source to a plurality of destination registers.

10. A method for transferring multiple bits of data across asynchronous clock domains comprising the steps of:
    detecting a change in a status bit of a data word being transferred from a source in a source clock domain to a destination register in a destination clock domain, the source clock and destination clock being asynchronous;
    sampling the detected change in reference to a change window, the change window sized to encompass all bits of the data word;
    selecting a stable input for each bistable circuit of the destination register based on whether the detected change in the status bit is likely to produce metastability in the destination register; and
    registering the data and a status bit in a source register clocked by the source clock.

11. A method for transferring multiple bits of data across asynchronous clock domains comprising the steps of:
    detecting a change in a status bit of a data word being transferred from a source in a source clock domain to a destination register in a destination clock domain, the source clock and destination clock being asynchronous;
    sampling the detected change in reference to a change window, the change window sized to encompass all bits of the data word;
    selecting a stable input for each bistable circuit of the destination register based on whether the detected change in the status bit is likely to produce metastability in the destination register; and clocking a plurality of receive register flip-flops with a delayed copy of the destination clock.

12. A circuit for transferring multiple bits of data across asynchronous clock domains comprising:

a source clocked by a first source clock, the source storing a data word and a status bit; and a receiving circuit including:

a monitoring circuit, wherein one input is operatively coupled to receive a status bit output of the source, a second input operatively coupled to receive a destination clock, and an output operatively coupled to control inputs of a group of multiplexers;

a delay element having an input operatively coupled to the destination clock and an output operatively coupled to a clock input of a destination register;

a first group of delay elements including a plurality of delay elements equal in number to a number of bits in the source, wherein each delay element of the first group of delay elements has an input operatively coupled to one source output;

a second group of delay elements including a plurality of delay elements, wherein each delay element of the second group of delay elements has an input operatively coupled to a same source output as a corresponding delay element in the first group of delay elements;

the destination register having data inputs operatively coupled to the outputs of the group of multiplexers, the group of multiplexers being equal in number to a number of bits in the destination register, wherein each multiplexer has a first data input operatively coupled to receive a signal from an output of a corresponding delay element of the first group of delay elements and a second data input operatively coupled to receive a signal from an output of a corresponding delay element of the second group of delay elements.

13. The circuit of claim 12, further comprising a plurality of receive circuits.

14. The circuit of claim 12, wherein the source includes a register.

15. The circuit of claim 12, wherein the source includes a FIFO.

16. The circuit of claim 12, wherein the source includes a RAM.

17. The circuit of claim 12, wherein the destination register includes flip-flops.

18. The circuit of claim 12, wherein the destination register includes latches.

19. The circuit of claim 12, wherein the second data input of each multiplexer of the group of multiplexers is operatively coupled to a static signal.

20. The circuit of claim 12, wherein the second data input of each multiplexer of the group of multiplexers is operatively coupled to an output of the source.

* * * * *